United States Patent [19]

Nadan

[11] Patent Number: 4,613,903
[45] Date of Patent: Sep. 23, 1986

[54] HIGH-RESOLUTION TELEVISION TRANSMISSION SYSTEM

[75] Inventor: Joseph S. Nadan, New York, N.Y.

[73] Assignee: North American Philips Corporation, New York, N.Y.

[21] Appl. No.: 597,327

[22] Filed: Apr. 6, 1984

[51] Int. Cl.⁴ .............................................. H04N 7/08
[52] U.S. Cl. ................................... 358/141; 358/142
[58] Field of Search .................. 358/141, 142, 11, 12, 358/14, 15

[56] References Cited

U.S. PATENT DOCUMENTS

| | | | |
|---|---|---|---|
| 4,510,520 | 4/1985 | Parker et al. | 358/12 |
| 4,520,385 | 5/1985 | Jackson et al. | 358/12 |
| 4,567,508 | 1/1986 | Hulyer | 358/11 |

OTHER PUBLICATIONS

Powers, Kerns H., "Compatibility Aspects of HDTV", High Definition Colloquium 82, Oct. 18-21, 1982, pp. 1.6-1 to 1.6-17.
Jackson et al., "Systems Concepts in High Fidelity Television", International Broadcast Convention, Sep. 18-21, 1982, pp. 135-139.

*Primary Examiner*—Tommy P. Chin
*Assistant Examiner*—David E. Harvey
*Attorney, Agent, or Firm*—Thomas A. Briody; William J. Streeter; Edward W. Goodman

[57] ABSTRACT

A television system capable of generating a high-resolution television signal having a wider than standard aspect ratio and which is compatible with standard television receivers. In an NTSC format, the high-resolution television signal includes picture frames having a 5⅓:3 aspect ratio, 787 scanning lines and 3-90 Hz fields. This television signal is converted into two transmission signals, a first of which being compatible with standard television receivers and including, in a first field, the sum-average of the information from two of the high-resolution television signal fields and, in a second field, information from the remaining high-resolution television field, while the second of which includes the remaining information in the high-resolution television signal.

14 Claims, 23 Drawing Figures

| FIELD 1 | | | | | |
|---|---|---|---|---|---|
| ODD LINES OF FIELDS A−B | | | | | |
| ODD LINES LEFT PANELS FIELDS $\dfrac{A1-B1}{2}$ | UPPER HALF LEFT PANEL FIELD C1 | LOWER HALF LEFT PANEL FIELD C1 | LOWER HALF RIGHT PANEL FIELD C2 | UPPER HALF RIGHT PANEL FIELD C2 | ODD LINES RIGHT PANELS FIELDS $\dfrac{A2-B2}{2}$ |

FIG. 3H

| FIELD 2 | | | | | |
|---|---|---|---|---|---|
| EVEN LINES OF FIELDS A−B | | | | | |
| EVEN LINES LEFT PANELS FIELDS $\dfrac{A1-B1}{2}$ | UPPER HALF LEFT PANELS FIELDS $\dfrac{A1+B1}{2}$ | LOWER HALF LEFT PANELS FIELDS $\dfrac{A1+B1}{2}$ | LOWER HALF RIGHT PANELS FIELDS $\dfrac{A2+B2}{2}$ | UPPER HALF RIGHT PANELS FIELDS $\dfrac{A2+B2}{2}$ | EVEN LINES RIGHT PANELS FIELDS $\dfrac{A2-B2}{2}$ |

FIG. 3J

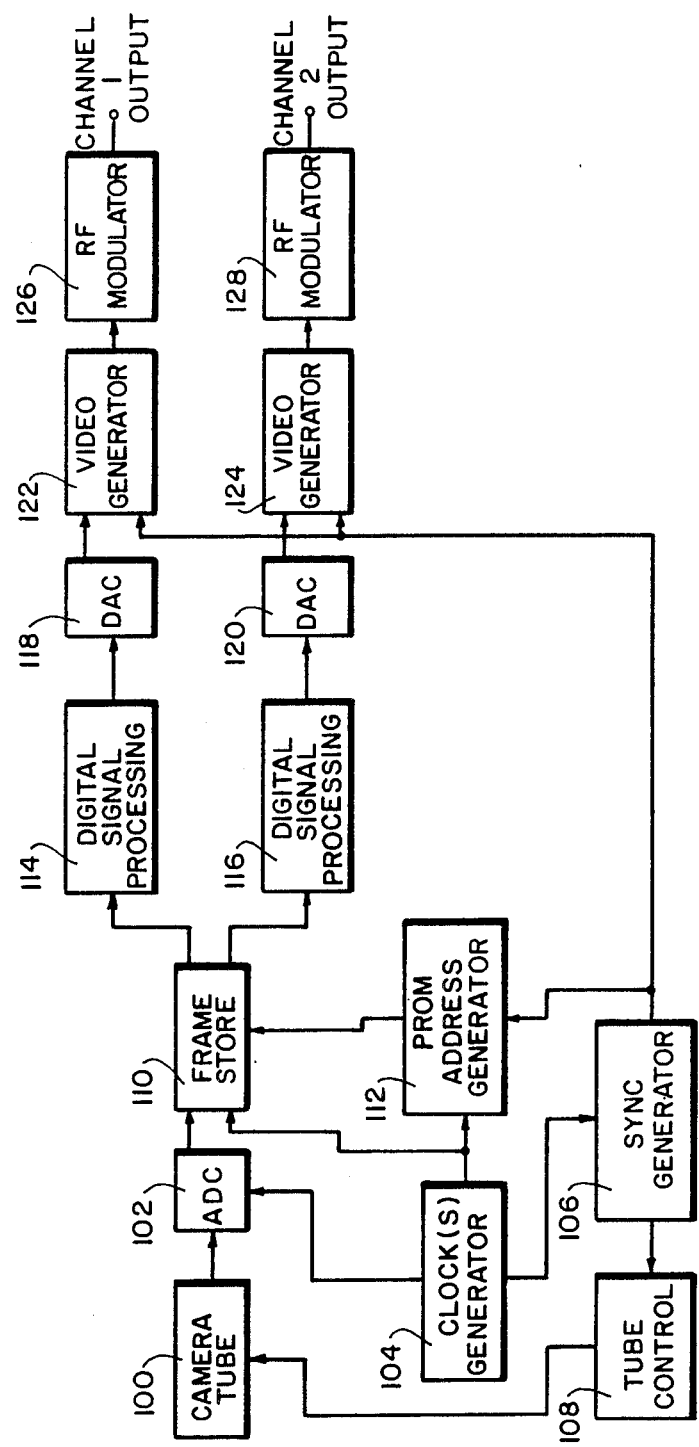

HIGH-RESOLUTION TELEVISION TRANSMISSION SYSTEM

BACKGROUND OF THE INVENTION

The invention relates to a television transmission system capable of transmitting a high-resolution television signal.

One of the most disturbing characteristics of present-day television is its inadequate vertical resolution as manifested on large displays by the viewer being able to discern the individual raster lines. Various systems have been proposed having an increased number of vertical scanning lines. However, these systems are not feasible as they require an excessive amount of bandwidth (e.g. 30 MHz.). Other systems have been proposed in which additional lines are transmitted over a separate channel or are generated in the television receiver by interpolation. One thing in common with all the above systems is an increase in cost to both the broadcaster as well as the consumer. This brings into play the marketing of the new television system. It has been shown that increased resolution alone may not be sufficient to offset the increase in cost of a television receiver to the consumer.

SUMMARY OF THE INVENTION

The object of this invention is to provide a high-resolution television transmission system compatible with existing television receivers and capable of being marketed to the public.

The above object is achieved in a television transmission system capable of transmitting a high-resolution television signal comprising picture frames having a width which is wider than that of a standard aspect ratio, which signal is furthermore capable of being displayed on a standard television receiver having said standard aspect ratio, characterized in that said picture frames comprise 1.5m scanning lines divided into 3-1.5n fields, where m is a standard number of scanning lines in a picture frame and n is a standard field frequency, said high-resolution television signal being converted into a first and a second transmission signal, said first transmission signal being compatible with said standard television receivers and including m scanning lines and 2-n fields, wherein said 2-n fields contain information from at least two of said 3-1.5n fields, said information relating to a selected portion of said picture frame corresponding to that of said standard aspect ratio, and said second transmission signal including m scanning lines and 2-n fields, wherein said second transmission signal includes information from said selected portion of said picture frame which, when combined with said information in said first transmission signal, enables the recovery of each of said 3-1.5n fields, and information from said 3-1.5n fields relating to that portion of said picture frame not included within said selected portion.

In a preferred embodiment of the invention, in said first transmission signal, a first of said 2-n fields includes information from a first of said 3-1.5n fields and a second of said 2-n fields includes an average of information from the other two of said 3-1.5n fields, and said second transmission signal includes a difference of the information from said other two of said 3-1.5n fields and information from said 3-1.5n fields relating to that portion of the picture frame not included in said selected portion.

The subject invention satisfies market appeal by presenting a picture on display which is significantly wider than that of present-day television systems.

TABLE 1

| Aspect Ratios | |
|---|---|
| NTSC (or PAL) TV | 1.33:1 |
| 35 mm Film Format 1 | 1.67:1 |
| High-Res. TV System | 1.78:1 |
| Human Field of Vision | 1.80:1 |
| 35 mm Film Format 2 | 1.85:1 |
| 70 mm Todd AO | 2.20:1 |
| 35 mm Cinemascope | 2.35:1 |

In particular, referring to Table 1, the subject television transmission system produces a displayed picture which, with respect to aspect ratio, approaches that of the field of vision for a human being. One need only to consider the impact, for example, Cinemascope had on the viewing experience of motion pictures to be able to appreciate the impact that the subject system would have on the television viewing public.

The subject invention increases the aspect ratio by 33.3% from a standard of 4:3 to 5⅓:3 and the number of scanning lines by 50%. For an NTSC compatible system, this would result in a picture frame having 787 scanning lines divided into 3-90 Hz. fields. Hence, the picture frame rate would remain at 30 Hz. while each individual field would have substantially 262 lines, the same as in a standard NTSC field. This high-resolution television signal is then converted into two transmission signals, a first of which containing the information which would render an acceptable picture, according to NTSC standards, on a typical television receiver, and the second containing the remaining information which, when combined with the first signal, would produce the high-resolution television signal. In certain configurations, this second transmission signal may also be viewable with a standard television receiver.

In addition, since the subject invention contemplates the use of two transmission signals, high quality stereo audio is also achievable, namely, in the first transmission signal, a sound subcarrier may be modulated with the signal $L+R$ while a sound subcarrier in the second transmission signal may be modulated with the signal $L-R$. By appropriately adding and subtracting these signals in a high-resolution television receiver, the L and R stereo channels are then available.

DESCRIPTION OF THE DRAWINGS

With the above and additional objects and advantages in mind as will hereinafter appear, the subject invention will be described with reference to the accompanying drawings in which:

FIG. 11 shows, in block diagram form, a television transmitter incorporating a second embodiment of the invention.

DESCRIPTION OF THE PREFERRED EMBODIMENTS

Figure 1:
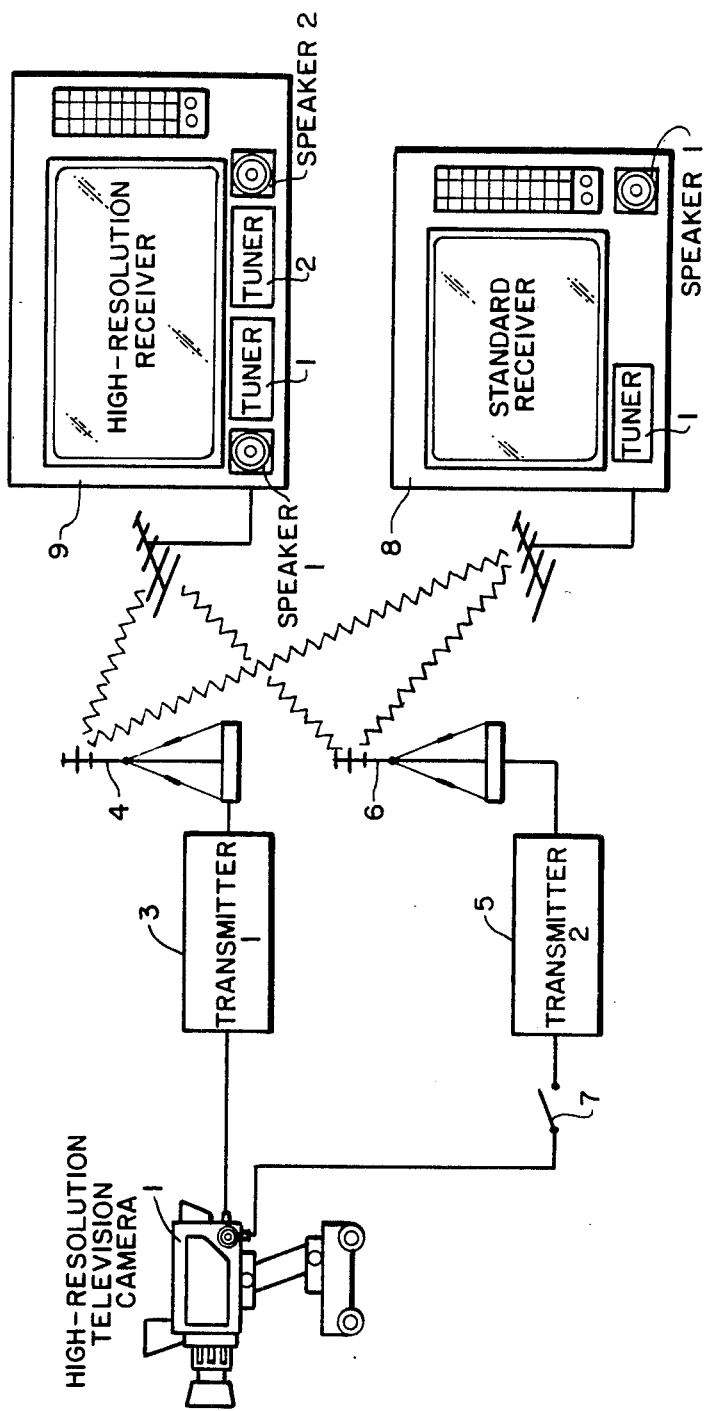
FIG. 1 shows a television transmission system incorporating the subject invention.

A television transmission system in accordance with the invention is shown in FIG. 1. A television camera 1 is adapted to generate a high-resolution television signal and contains circuitry for converting this signal to a first and a second transmission signal of which at least the first transmission signal conforms with, for example, the NTSC television standard. The first transmission signal is then applied to a first transmitter 3 with its associated transmission channel shown here as antenna 4 while the second transmission signal is simultaneously applied to a second transmitter 5 with its transmission channel shown as antenna 6. In the event that a standard broadcast is contemplated, a switch 7 is inserted before the second transmitter 5 and interrupts any signals thereto.

The first transmission signal is receivable by a standard television receiver 8 having a single tuner. However, with a high-resolution television receiver 9, both transmission signals may be simultaneously received, respectively, by the two tuners therein and thereupon reconverted into the high-resolution television signal.

Figure 2:
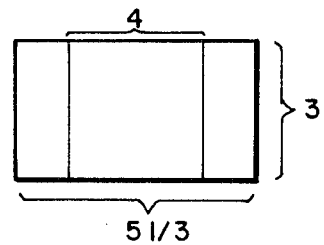
FIG. 2 shows a representation of a display obtainable with the invention.

As illustrated in FIG. 2, the subject television transmission system generates a high-resolution television signal for forming a picture on display having an aspect ratio of 5⅓:3. This is in contrast with the standard displayed picture having an aspect ratio of 4:3 which is conveniently shown in the center of the wider display picture.

Figure 3A:
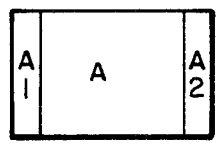
FIGS. 3A-3C show the three high-resolution fields forming a picture frame.
Figure 3B:
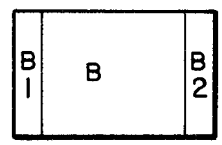
Figure 3C:
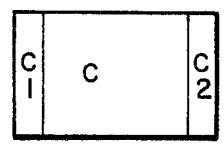

Each picture frame of the high-resolution television signal includes 50% more scanning lines than a standard picture frame and three fields having a field frequency which is 50% higher than the standard field frequency (see FIGS. 3A-3C). For the NTSC standard, this results in 787 scanning lines and 3-90 Hz. fields. Since this high-resolution television signal requires significantly more bandwidth than is currently available in a television transmission channel, the high-resolution television signal is converted into two transmission signals. This conversion is shown basically in FIGS. 3A-3J.

Figure 3D:
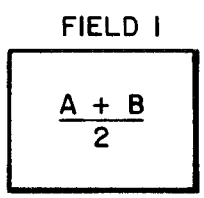
FIGS. 3D and 3E show the two fields of a picture frame on a first channel, and FIGS. 3F/3G and 3H/3J show possible arrangements of the two fields of a picture from a second channel.
Figure 3E:
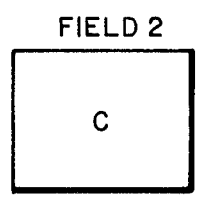
Figure 3F:
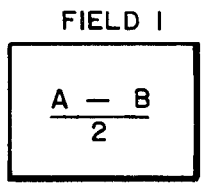
Figure 3G:
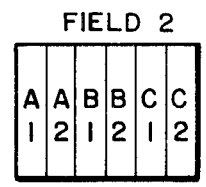

In FIGS. 3A-3C, the three fields of each picture frame in the high-resolution television signal include central areas A, B and C having aspect ratios of 4:3 and associated panels A1, A2, B1, B2, C1 and C2 containing the remaining portions of the 5⅓:3 aspect ratio display. For the first transmission signal as shown in FIGS. 3D and 3E, a first field includes the sum average of the information in areas A and B while a second field includes the whole of the information in area C. FIGS. 3F/3G and 3H/3J show two possible formats for the second transmission signal. In FIGS. 3F and 3G, a first field includes the difference average of the information from areas A and B while a second field includes all the information in the panels A1, A2, B1, B2, C1 and C2. This format for the second transmission signal is not, in general, viewable by itself.

FIGS. 3H and 3J show an alternate format for the second transmission signal which is recognizable to a viewer using a standard television receiver. In particular, in a first field, the top half thereof includes the odd lines of the difference average of areas A and B while the bottom half thereof includes, in sequence, the odd lines of $(A1-B1)/2$, the upper half of C1, the lower half of C1, the lower half of C2, the upper half of C2 and the odd lines of $(A2-B2)/2$, and in a second field, the top half thereof includes the even lines of the difference average of the areas A and B while the bottom half thereof includes, in sequence, the even lines of $(A1-B1)/2$, the upper half of $(A1+B1)/2$, the lower half of $(A1+B1)/2$, the lower half of $(A2+B2)/2$, the upper half of $(A2+B2)/2$ and the even lines of $(A2-B2)/2$. If this second transmission signal were then displayed by itself, the central four regions in the lower half of the picture would carry a viewable approximation of the panels while the remaining portions of the picture would be recognizable, thus serving as a form of continuous advertising to induce the purchase of a high-resolution television receiver.

It should be understood that while FIGS. 3D–3J show the sum average of the information in areas A and B being used to form a first field of the first transmission signal and all of area C being used to form the second field, the difference average of A and B being used in the second transmission signal, other combinations of areas A, B and C may alternatively be used. For example, the first field of the first transmission signal may include information from areas A and B in the ratio $(3A+B)/4$, while the second field may include information from the areas B and C in the ratio $(B+3C)/4$. The second transmission signal may then include all of the information in area C along with the panels.

Figure 4:
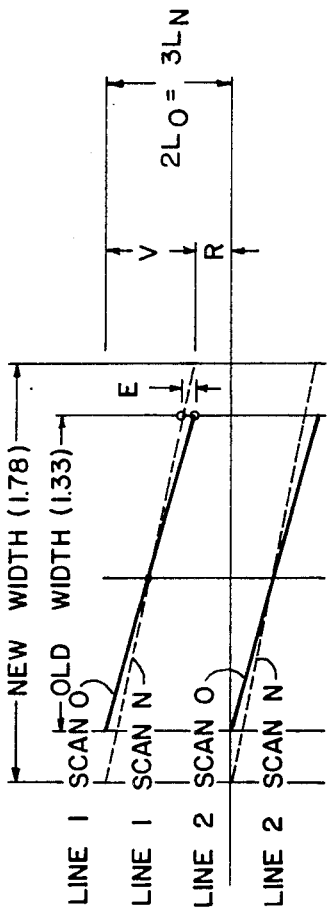
FIG. 4 shows a comparison of the line scans for a standard television signal and for the high-resolution television signal of the subject invention.

Since the areas A, B and C of the fields in the high-resolution television signal are used directly to form the fields in the first transmission signal, there are some errors in scanning which should be considered. In particular, FIG. 4 shows a comparison of two standard NTSC scan lines and two lines from the high-resolution television signal. Both scans cover the same vertical distance V and both scan retraces cover the same vertical distance R. The distance V+R corresponds to two interline distances in the NTSC system and to three interline distances in the subject system; i.e. $(V+R)=2L_0=3L_n$. If the portion of the new scan lines within the old width are used to generate an approximation to the NTSC system (areas A, B and C in FIGS. 3A–3C), the maximum scan error is $E_{max}=0.21L_0=0.31L_n$, and the RMS scan error is $E_{rms}=0.12L_0=0.18L_n$, which are imperceptibly small. The angle between the two scan lines is only 0.034° or $5.94 \times 10^{-4}$ radians.

Figure 5A:
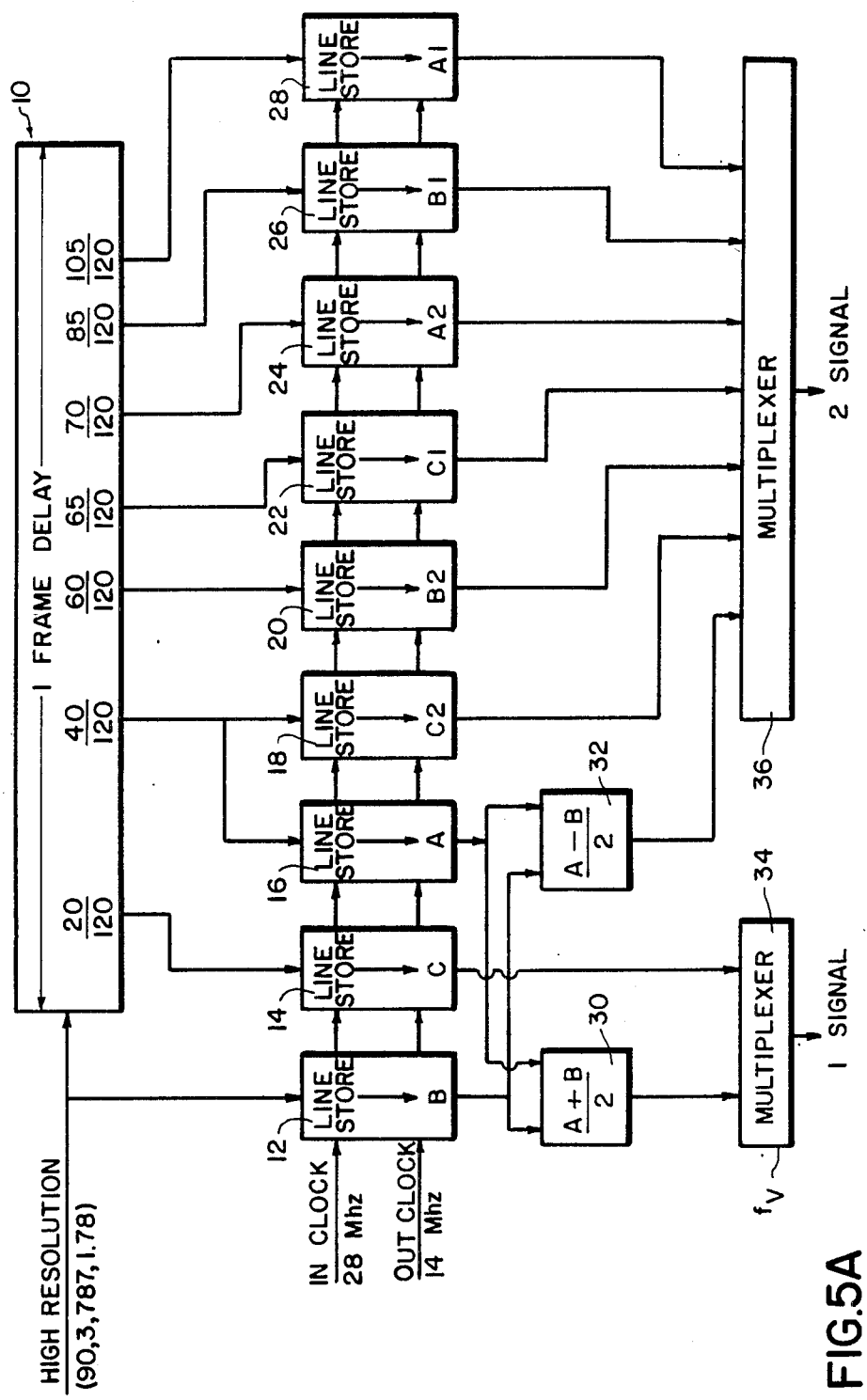
FIGS. 5A and 5B show, in block diagram form, an embodiment for converting the high-resolution television signal to two transmission signals.

FIG. 5A shows an analog embodiment for a converter for use in a television transmitter. The converter includes a delay circuit 10 having a delay equivalent to one picture frame. A high-resolution television signal comprising 3-90 Hz. fields having 787 lines and a 1.78

Figure 5B:
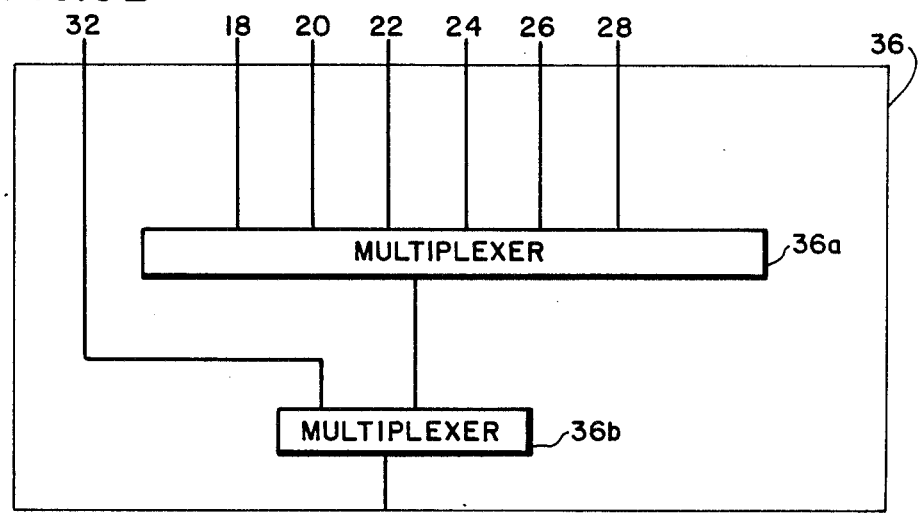
Figure 6:
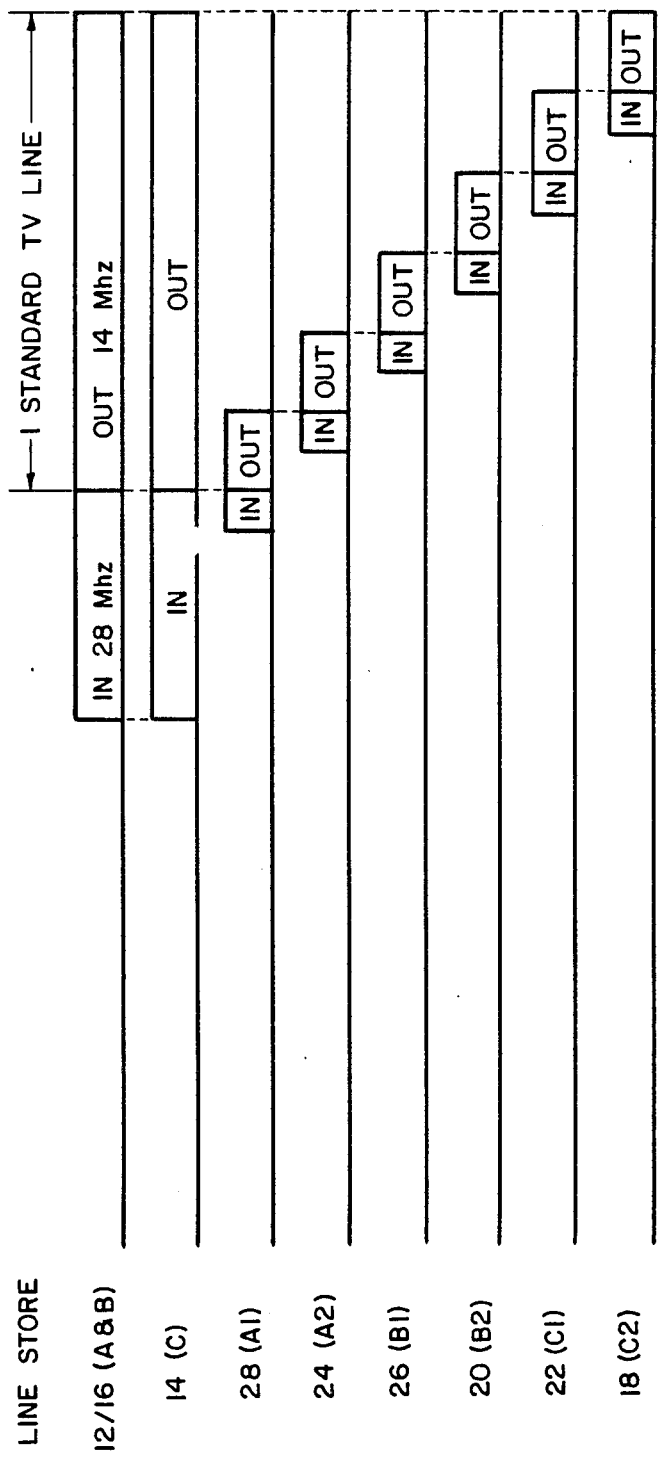
FIG. 6 shows the clock timing for various components in FIG. 5A.
Figure 7:
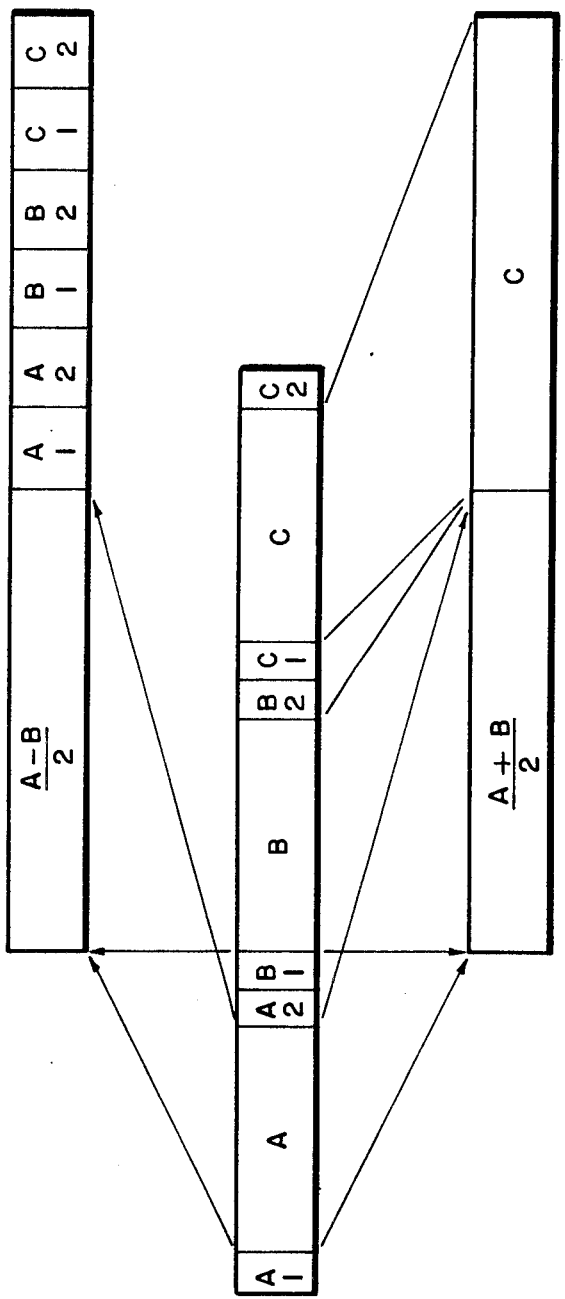
FIG. 7 shows, graphically, the converting of the high-resolution television signal to the two transmission signals.

(5⅓:3) aspect ratio is applied to an input of the delay circuit 10. This high-resolution signal may be generated by any of a number of adapted video signal sources, for example, a video camera, a video tape recorder, a telecine, etc. The converter further includes nine-one line stores 12-28, inclusive. Line store 12 is arranged to receive the high-resolution television signal while the remaining line stores 14-28 are coupled to various taps in the delay circuit 10, line stores 16 and 18 being coupled to the same tap. The output of line stores 12 and 16 are applied both to a "sum" averaging circuit 30 and to a "difference" averaging circuit 32. The outputs of the sum averaging circuit 30 and line store 14 are then applied to a first multiplexer 34 for forming the first transmission signal, while the outputs of the difference averaging circuit 32 and the line stores 18-28 are applied to a second multiplexer 36 for forming the second transmission signal. The multiplexer 36 may be formed from two multiplexers 36a and 36b as shown in FIG. 5B, in which the signals from line stores 18-28 are applied to the multiplexer 36a while the output of multiplexer 36a along with the signal from circuit 32 are applied to the multiplexer 36b. Each line store 12-28 has a "clock in" input and a "clock out" input to which a 28 MHz. and a 14 MHz. signal are respectively applied in accordance with the timing diagram shown in FIG. 6. In particular, the clock signals to line stores 12 and 16 are applied repetitively for each standard television line for the duration of one standard field during alternate fields, while, during intervening fields, the clock signals to line store 14 and the sequence of clock signals to line stores 28, 24, 26, 20, 22 and 18 are applied repetitively for each standard television line for the duration of one standard field. The multiplexers 34 and 36b receive a clocking signal at the standard field frequency $f_v$, while the multiplexer 36a receives a clocking signal at the rate of $6f_h$, where $f_h$ is the standard line frequency, for the duration of one field during alternate field periods. FIG. 7 shows graphically the effects of the above conversion.

Figure 8B:
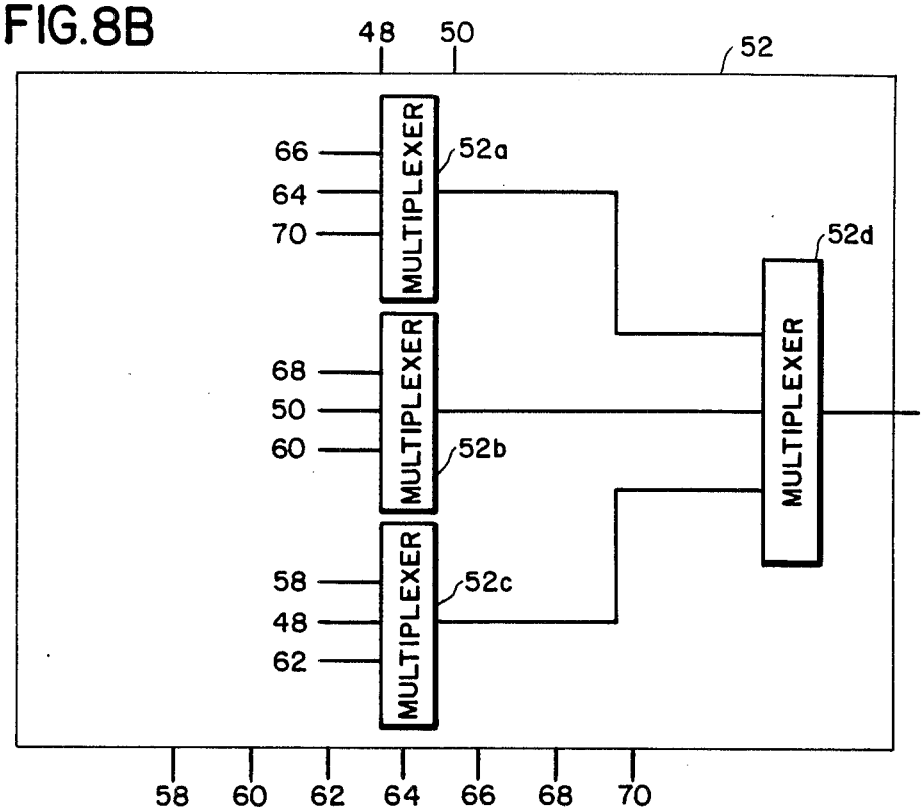
FIGS. 8A and 8B show, in block diagram form, an embodiment complementary to FIGS. 5A and 5B for reconstructing the high-resolution television signal from the two transmission signals.
Figure 8A:
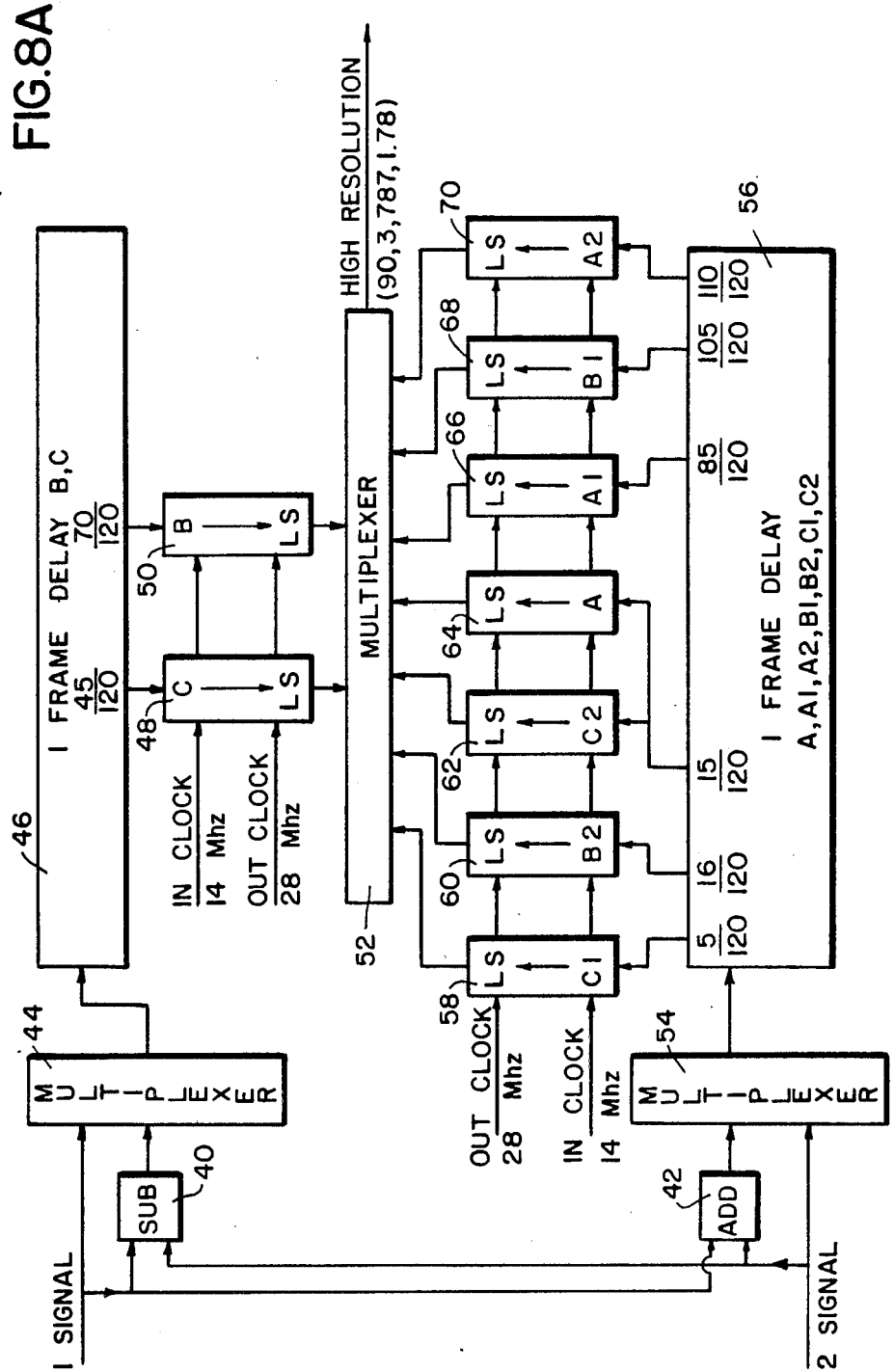
Figure 9A:
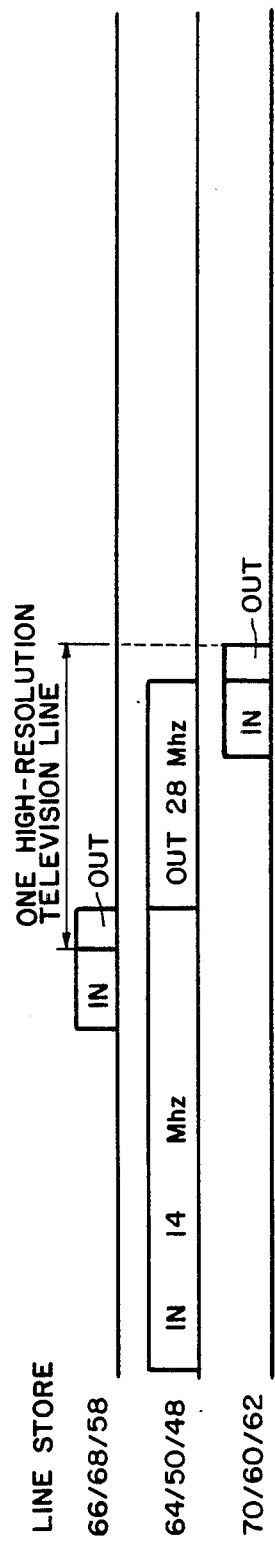
FIGS. 9A and 9B show the clock timing for various components in FIGS. 8A and 8B.
Figure 9B:
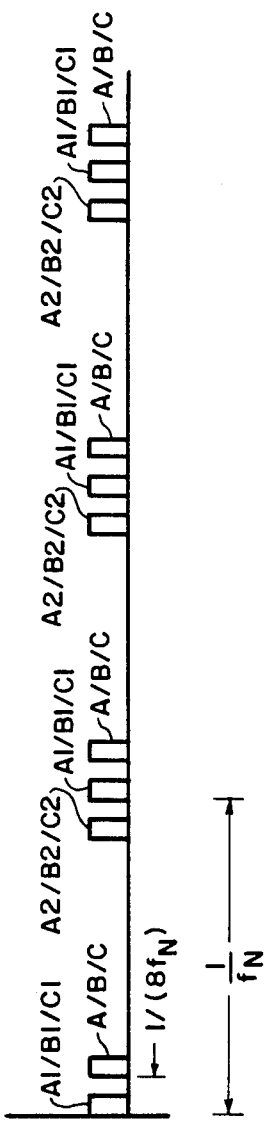
Figure 10:
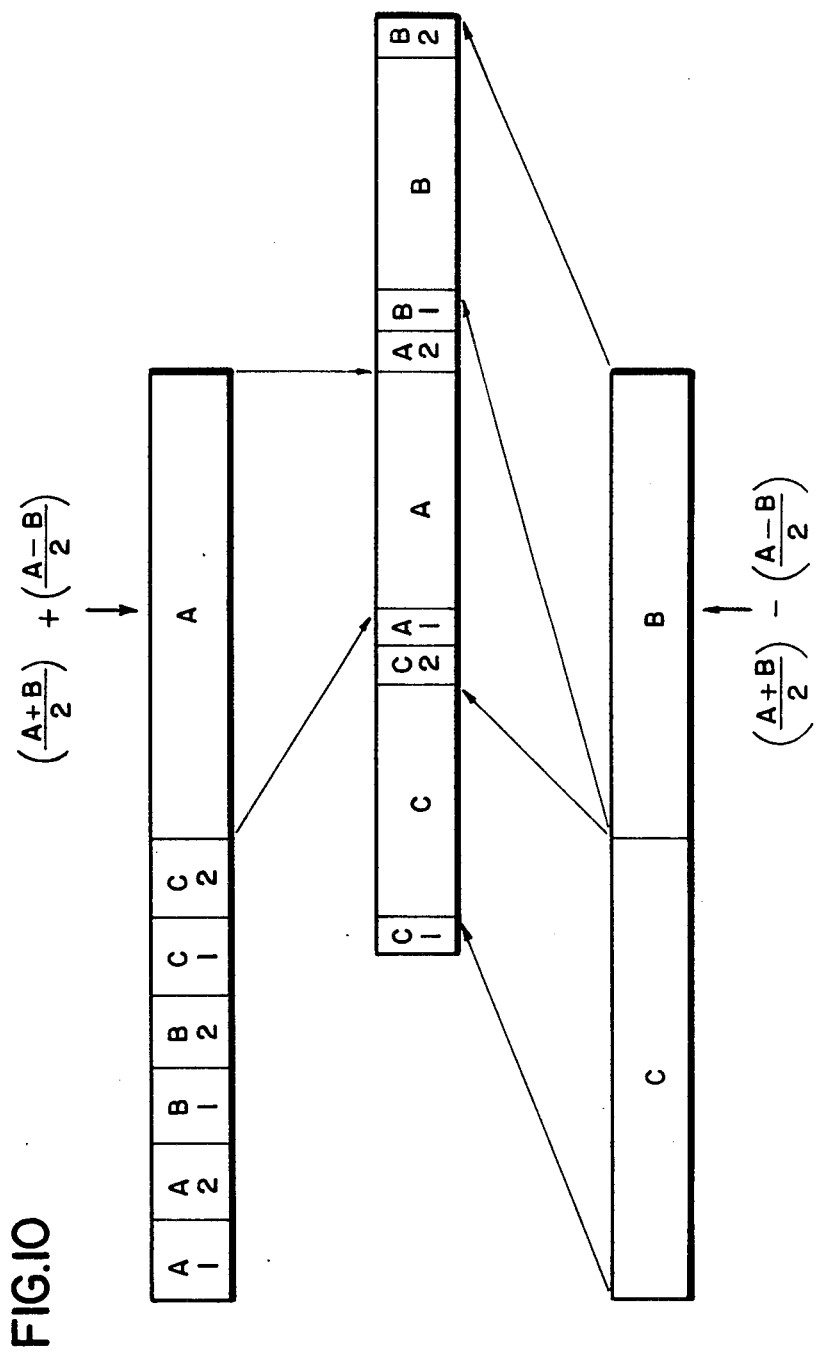
FIG. 10 shows, graphically, the reconstructing of the high-resolution television signal from the two transmission signals.

FIG. 8A shows an embodiment for a converter for use in a high-resolution television receiver. After the appropriate tuning and demodulating, the first transmission signal is applied to one input of a subtracting circuit 40 and to one input of an adding circuit 42 while the second transmission signal is applied to the other respective inputs of the subtracting and adding circuits 40 and 42. The output of the subtracting circuit 40 along with the first transmission signal are applied to a multiplexer 44, the output of which is applied to a delay circuit 46 having taps. Line stores 48 and 50 are respectively coupled to the delay circuit 46 taps, the outputs from which being applied to a multiplexer 52. At the same time, the output of the adding circuit 42 along with the second transmission signal are applied to a multiplexer 54, the output of which being applied to a second delay circuit 56 having taps. Line stores 58-70 are coupled respectively to the delay circuit 56 taps, the outputs from. which being also applied to the multiplexer 52. The multiplexer 52 may be formed from four multiplexers 52a-52d as shown in FIG. 8B, in which the signals from line stores 66, 64 and 70 are applied to multiplexer 52a, the signals from line stores 68, 50 and 60 are applied to multiplexer 52b, and the signals from line stores 58, 48 and 62 are applied to multiplexer 52c, the outputs of multiplexers 52a-52c being applied to multiplexer 52d. The output of the multiplexer 52 now comprises the high-resolution television signal. Each of the delay circuits 46 and 56 has a delay of one picture frame. Each of the line stores 48, 50 and 58-70 also has a "clock-in" input and a "clock-out" input to which a 14 MHz. and 28 MHz. signal are respectively applied in accordance with the timing diagram shown in FIG. 9A. In particular, the clocking signals to line stores 66, 64 and 70 are applied repetitively for each high-resolution television line for the duration of one high-resolution field during a first of every three high-resolution fields, the clocking signals to line stores 68, 50 and 60 are applied repetitively for each high-resolution television line for the duration of our high-resolution field during a second of every three high-resolution fields, and the clocking signals to line stores 58, 48 and 62 are applied repetitively for each high-resolution television line for the duration of one high-resolution field during a third of every three high-resolution fields. The multiplexers 44 and 54 each receive a clocking signal at the standard field frequency $f_v$, while in the multiplexer 52, the multiplexers 52a, 52b and 52c, respectively, receive the clocking signals shown in FIG. 9B for each high-resolution television line for the duration of one high-resolution field during every first, second and third high-resolution field, respectively. FIG. 10 shows graphically the effects of the above conversion.

Using the above conversions, the format for the second transmission signal would be in accordance with FIGS. 3F and 3G.

Figure 12:
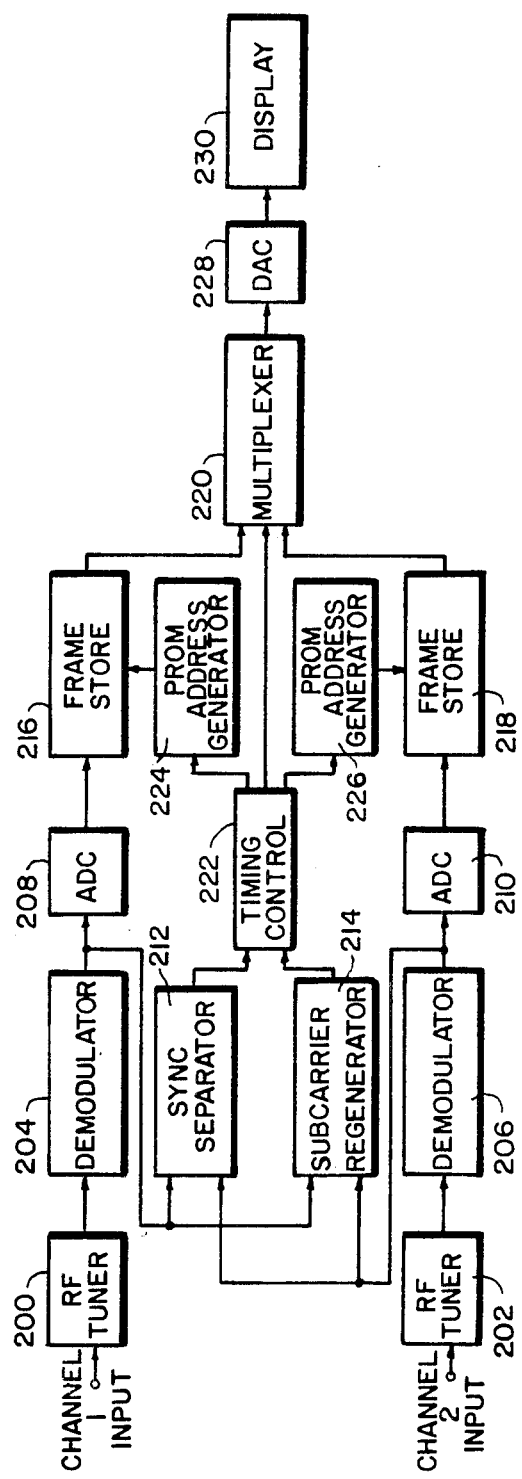
FIG. 12 shows, in block diagram form, a television receiver incorporating a second embodiment of the invention.

The above description has been based on an analog system. FIGS. 11 and 12, on the other hand, present a digital embodiment of the subject television transmission system. In particular, in FIG. 11, camera tubes 100 generate the high-resolution television signal which is applied to an analog-to-digital converter 102. A clock generator 104 generates control signals for the analog-to-digital converter 102 and for a synchronizing signal generator 106 which produces the synchronizing signals for a tube control circuit 108 which, in turn, controls the camera tubes 100. The output of the analog-to-digital converter 102 is applied to a memory 110, having the capacity of at least one high-resolution picture frame, which receives clocking signals from the clock generator 104. The contents of the memory 110 are applied to a first or a second output thereof in accordance with address signals from an address generator 112, which receives control signals from the clock generator 104 and synchronizing signals from the synchronizing signal generator 106. The outputs of the memory 110 are applied to, in sequence, respective digital signal processing circuits 114 and 116, respective digital-to-analog converters 118 and 120 and respective video generators 122 and 124, in which generators the signals are combined with synchronizing signals from the synchronizing signal generator 106 to form the first and second transmission signals, respectively. The first and second transmission signals are then applied to respective RF modulators 126 and 128 for modulating the same onto separate broadcast carriers.

The address generator 112 may be in the form of a PROM and is programmed such that it generates, in response to the control signals and synchronizing signals applied thereto, the appropriate addresses such that the digital equivalent of the first and second transmission signals appear at the outputs of the memory 110.

FIG. 12 shows an embodiment of a digital high-resolution television receiver which includes RF tuners 200 and 202 for tuning to the respective broadcast carriers. The signals from the RF tuners 200 and 202 are then demodulated in respective demodulators 204 and 206 and are applied, on the one hand, to respective analog-to-digital converters 208 and 210 and, on the other hand, to a synchronizing signal separator 212 and a subcarrier regenerator 214. The outputs of the analog-to-digital converters 208 and 210 are then applied to respective standard picture frame memories 216 and 218, the outputs of which are applied to respective inputs of a multiplexer 220. The synchronizing signal separator 212 and the subcarrier regenerator 214 are coupled to a timing signal generator 222 which applies control signals to the respective address generators 224 and 226, which control the reading of the memories 216 and 218, respectively, and to the multiplexer 220. The output of the multiplexer 220 is applied to a digital-to-analog converter 228 for forming the high-resolution television signal which, in turn, is applied to a high-resolution display 230 having a 5⅓:3 aspect ratio.

The address generators 224 and 226 may be PROM's and are programmed complementary to the address generator 112. It should be apparent that in this embodiment, the format for the second transmission signal may be as desired, for example, as in FIGS. 3H and 3J, since each television line in the central areas A, B and C and in the panels A1, A2, B1, B2, C1 and C2 of the high-resolution television signal may be in separate locations in the memories 110 and 216/218 and may be individually accessed and combined under the control of the address generators 112 and 224/226.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

What is claimed:

1. A method of transmitiing a high-resolution television signal containing first picture information which, on display, forms first picture frames having a width which is wider than that of a standard aspect ratio, said high-resolution television signal being transmitted in the form of a first and a second transmission signal each having a format compatable with a standard television receiver having said standard aspect ratio, each of said first picture frames comprising 1.5m scanning lines which are displayed in three 1.5n fields, where m is a number of scanning lines in a standard picture frame and n is a standard field frequency, characterized in that said method comprises:

converting said high-resolution television signal into said first transmission signal compatible with said standard television receiver and containing second picture information derived from said first picture information in said high-resolution television signal from at least two of said three 1.5n fields, the second picture information in said first transmission signal forming, on display, second picture frames each having m scanning lines and two n fields, said second picture frames corresponding to a selected portion of said first picture frames having said standard aspect ratio;

converting said high-resolution television signal into said second transmission signal containing third picture information forming, on display, third picture frames having said standard aspect ratio and having m scanning lines and two n fields, the third picture information in said second transmission signal including said first picture information in said high-resolution television signal which, on display, forms the portion of said first picture frames not included within said selected portion of said first picture frames, the picture information in said second transmission signal further being derived from said first picture information in said high-resolution television signal which corresponds to said selected portion of said first picture frames, whereby the second and the third picture information in said first and said second transmission signals collectively represent substantially all of the first picture information in said high-resolution television signal;

modulating said first and said second transmission signals onto a first and a second carrier; and simultaneously transmitting said first and said second carriers.

2. The method of transmitting a high-resolution television signal as claimed in claim 1, characterized in that in said first transmission signal, the second picture information forming a first of said two n fields includes the first picture information in said high-resolution television signal forming a first of said three 1.5N fields in said selected portion of said first picture frames and the second picture information forming a second of said two n fields includes an average of said first picture information in said high-resolution television signal forming the other two of said three 1.5n, fields in said selected portion of said first picture frames while in said second transmission signal, the third picture information includes a difference of said first picture information in said high-resolution television signal forming said other two of said three 1.5n fields in said selected portion of said first picture frames.

3. The method of transmitting a high-resolution television signal as claimed in claim 2, characterized in that in said second transmission signal, the third picture information forming one of said two n fields includes said difference picture information while the third picture information forming the other of said two n fields includes the first picture information in said high-resolution television signal forming said portion of the first picture frames not included within said selected portion.

4. The method of transmitting a high-resolution television signal as claimed in claim 2, characterized in that in said second transmission signal, a first part of one of said two n fields is formed by half of said difference picture information and a second part of said one field is formed by said first picture information in said high-resolution television signal forming half of said portion of said first picture frames not included in said selected portion, while a first part of the other of said two n fields, corresponding to said first part of said one field, is formed by the other half of said difference picture information and a second part of said other field, corresponding to said second part of said one field, is formed by said first picture information in said high-resolution television signal forming the other half of said portion of said first picture frames not included in said selected portion, whereby, on display, at least said second parts of said one and said other fields are recognizable as being a part of said first picture frames.

5. A television transmission system as claimed in claim 1, 2, 3 or 4, characterized in that the first picture information in said high resolution television signal forms, on display, said first picture frames having 787 scanning lines and three 90 Hz fields.

6. A television transmission system as claimed in claim 1, 2, 3 or 4, characterized in that said first picture frames have an aspect ratio of 5⅓:3.

7. A television transmitter for transmitting a high-resolution television signal containing first picture information which, on display, forms first picture frames having a width which is wider than that of a standard aspect ratio, said high-resolution television signal being transmitted in the form of a first and a second transmission signal each having a format compatible with a standard television receiver having said standard aspect ratio, each of said first picture frames comprising 1.5m scanning lines which are displayed in three 1.5n fields, where m is a number of scanning lines in a standard picture frame and n is a standard field frequency, characterized in that said television transmitter comprises:
means for generating said high-resolution television signal;
first means for converting said high-resolution television signal into said first transmission signal compatible with said standard television receiver and containing second picture information derived from said first picture information in said high-resolution television signal from at least two of said three 1.5n fields, the second picture information in said first transmission signal forming, on display, second picture frames each having m scanning lines and two n fields, said second picture frames corresponding to a selected portion of said first picture frames having said standard aspect ratio;
said first converting means also for converting said high-resolution television signal into said second transmission signal containing third picture information forming, on display, third picture frames having said standard aspect ratio and having m scanning lines and two n fields, the third picture information in said second transmission signal including said first picture information in said high-resolution television signal which, on display, forms the portion of said first picture frames not included within said selected portion of said first picture frames, the third picture information in said second transmission signal further including said first picture information in said high-resolution television signal which corresponds to said selected portion of said first picture frames, whereby the second and the third picture information in said first and said second transmission signals collectively represent substantially all of the first picture information in said high-resolution television signal;
means for modulating said first and second second transmission signals onto a first and a second carrier; and
means for simultaneously transmitting said first and said second carriers.

8. A television transmitter as claimed in claim 7, characterized in that in said first transmission signal, the second picture information forming a first of said two n fields includes the first picture information in said high-resolution television signal forming a first of said three 1.5N fields in said selected portion of said first picture frames and the second picture information forming a second of said two n fields includes an average of said first picture information in said high-resolution television signal forming the other two of said three 1.5n fields in said selected portion of said first picture frames, while in said second transmission signal, the third picture information includes a difference of said first picture information in said high-resolution television signal forming said other two of said three 1.5n fields in said selected portion of said first picture frames.

9. A television transmitter as claimed in claim 8, characterized in that said first converting means comprises a delay circuit, having a delay equal to the duration of a single picture frame, to which said high-resolution television signal is applied, said delay circuit having taps thereto representing portions of said picture frame delay, a plurality of line stores, one of which is coupled to receive said high-resolution television signal and the others of which are coupled to respective ones of said taps, means coupled to two of said line stores for forming an average sum of the outputs therefrom, a first multiplexer coupled to receive said average sum along with the output of a third of said line stores for forming said first transmission signal, means coupled to said two line stores for forming a difference average of the outputs therefrom, and a second multiplexer coupled to receive the difference average along with the outputs of the remaining line stores not coupled to said first multiplexer for forming said second tranmission signal.

10. A television transmitter as claimed in claim 7 or 8, characterized in that said first converting means comprises an analog-to-digital converter to which said high-resolution television signal is applied, a memory coupled to said analog-to-digital converter for storing digital signals corresponding to at least a single one of said first picture frames, said memory having a first and second output, an address generator for addressing locations in said memory and causing the digital signals therein, corresponding to the second picture information in said first transmission signal, to be applied to said first memrory output and the digital signals therein, corresponding to the third picture information in said second transmission signal, to be applied to said second memory output, first and second digital-to-analog converters coupled to said first and second memory outputs, respectively, for providing said first and second transmission signals, respectively, and timing signal generating means for controlling the analog-to-digital converter, writing of the digital signals into said memory and address generation by said address generator.

11. A television receiver for receiving and displaying said high-resolution television signal transmitted by the television transmitter as claimed in claim 7, characterized in that said television receiver comprises means for simultaneously receiving said first and second transmission signals, second means for converting said first and second transmission signals into said high-resolution television signal, and display means for displaying said high-resolution television signal with said wider than standard aspect ratio.

12. A television receiver for receiving means displaying said high-resolution television signal transmitted by the television transmitter as claimed in claim 8, characterized in that said television receiver comprises means for simultaneously receiving said first and second transmission signals, second means for converting said first and second transmission signals into said high-resolution television signal, and display means for displaying said high-resolution television signal with said wider than standard aspect ratio.

13. A television receiver as claimed in claim 12, characterized in that said second converting means comprises an adding circuit and a subtracting circuit to both of which said first and second transmission signals are applied, a first multiplexer to which said first transmission signal and an output of said subtracting circuit are applied, a second multiplexer to which said second transmission signal and an output of said adding circuit are applied, a first and a second delay circuit, each having a delay equal to the duration of one of said first, second, or third picture frames, to which an output of said first and said second multiplixers are respectively applied, said first and second delay circuits each having taps thereto representing portions of said picture frame delay, a plurality of line stores coupled, respectively, to said taps, and a third multiplexer coupled to the outputs of said line stores and having an output for providing said high-resolution television signal.

14. A television receiver as claimed in claim 11 or 12, characterized in that said second converting means comprises first and second analog-to-digital converters to which said first and second transmission signals are applied, respectively, first and second memories coupled to said first and second analog-to-digital converters, respectively, each of said memories being capble of storing digital signals from said analog-to-digital converters forming at least a single picture frame, a multiplexer coupled to an output of each of said memories, a digital-to-analog converter coupled to an output of said multiplexer, a first and second address generator coupled to said first and second memories, respectively, for addressing locations in said memories, and timing signal generating means for controlling said first and second address generators and said multiplexer whereby said high-resolution television signal is formed at the output of said digital-to-analog converter.

* * * * *